United States Patent [19]

Herrick

[11] 4,410,284

[45] Oct. 18, 1983

[54] COMPOSITE FLOATING ELEMENT THRUST BEARING

[75] Inventor: G. Richard Herrick, Irvine, Calif.

[73] Assignee: Smith International, Inc., Newport Beach, Calif.

[21] Appl. No.: 370,809

[22] Filed: Apr. 22, 1982

[51] Int. Cl.³ .................... F16C 33/10; F16C 33/66; E21B 10/22

[52] U.S. Cl. ................................. 384/93; 175/227; 175/371

[58] Field of Search .................. 384/92, 93, 95, 305, 384/307, 311, 368, 371, 376, 378, 425; 175/229, 228, 227, 371, 372

[56] References Cited

U.S. PATENT DOCUMENTS

| | | | |
|---|---|---|---|
| 3,235,316 | 2/1966 | Wranger | 384/95 |
| 3,597,027 | 8/1971 | Herndon | 384/305 |
| 3,720,274 | 3/1973 | McCallum | 175/372 |
| 4,130,325 | 12/1978 | Schultenkämder | 384/425 |
| 4,333,691 | 6/1982 | Cooper | 384/93 |

Primary Examiner—Stuart S. Levy
Assistant Examiner—David J. Werner
Attorney, Agent, or Firm—Robert G. Upton

[57] ABSTRACT

A rolling cutter drill bit with at least one downwardly extending leg which supports a cantilevered bearing shaft thereon is disclosed. A cutter cone is rotatably mounted on the bearing shaft by radial bearing means and by axial bearing means. A radially disposed thrust washer is positioned between the journal and the cone, the washer further defining a lubricant transferring means in each radially disposed side of the thrust washer to assure adequate lubrication of the roller cone on the journal bearing.

10 Claims, 5 Drawing Figures

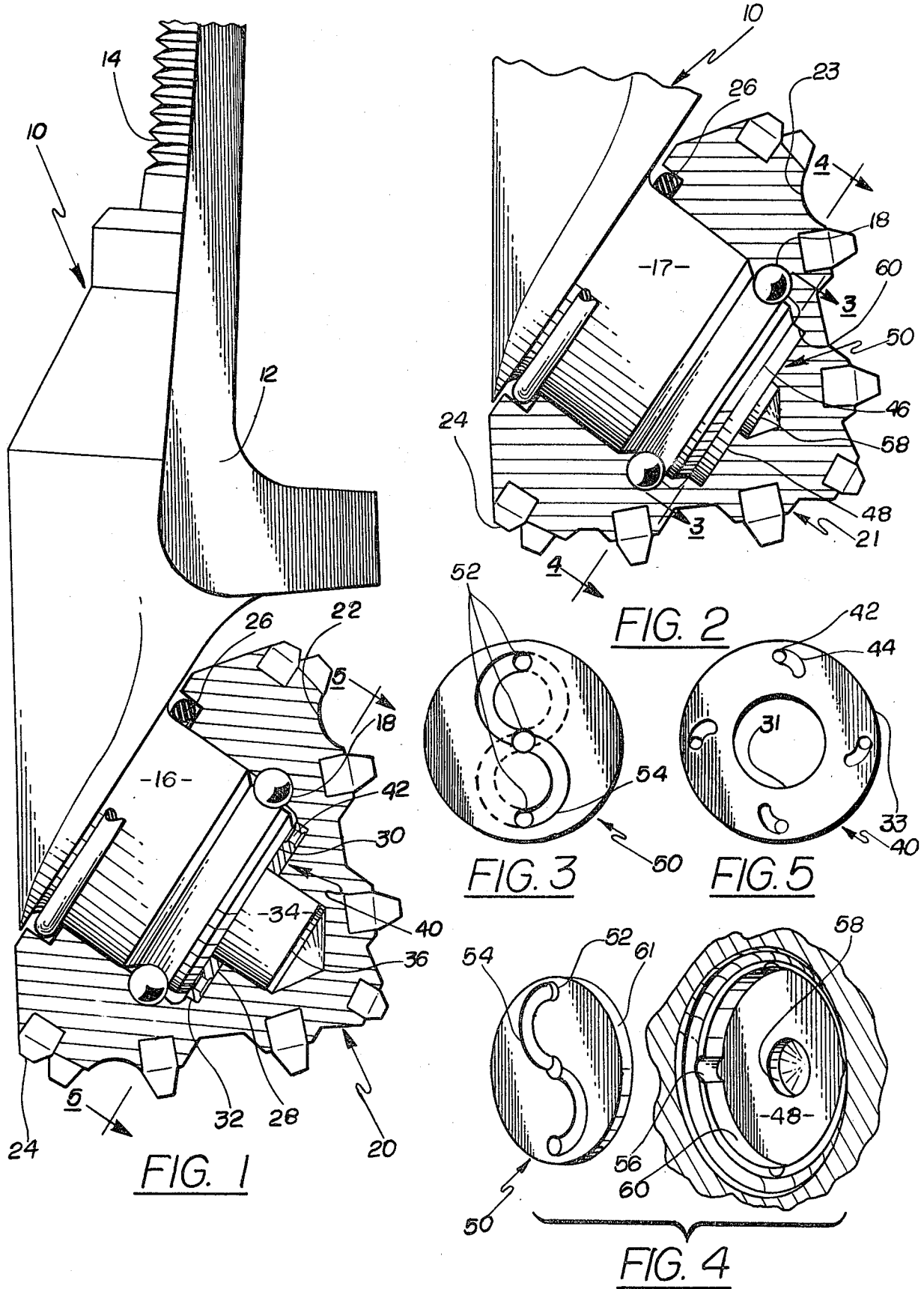

COMPOSITE FLOATING ELEMENT THRUST BEARING

BACKGROUND OF THE INVENTION

1. Field of the Invention

This invention relates to bearings used in rotating cone rock bits.

More particularly, this invention relates to radially disposed thrust bearings used therein.

The rotating cone, which has rock-crushing teeth on the outer surface, is mounted on a short cantilevered journal shaft extending from a leg of the bit body. The end of the journal enters the base of the cone. Various designs of rock bits utilize one or more cones. Most generally, however, three cones are used. The rock bit is secured to the lower end of a drill pipe which is turned by a rotary table aboveground. As the bit turns, the teeth in the cones penetrate a rock formation. As the cones roll, a continuous repetition of teeth secured to the cone contact the rock formation to disintegrate the rock and bore a hole therein.

Very large downward forces are required to penetrate hard rock and, since the journal bearing shaft supporting the cone is of necessity angled downward, a considerable portion of the downward force is axial with respect to the journal bearing and must be borne or absorbed by a radially disposed thrust bearing positioned between the cone and the end of the supporting journal bearing.

A greater portion of the downward force is however radial with respect to the journal bearing and is carried by the journal shaft. A smaller radial spindle bearing shaft, concentric with and extending from the journal shaft, is positioned nearer the apex of the cone and also carries some of the radial load.

A grease seal, such as an O-ring, environmentally protects all the bearings.

Excessive wear or breakdown of the radially disposed thrust bearing will permit the cone to move axially toward the seal and toward a backface of the leg portion supporting the journal. If the seal becomes damaged or if the cone impinges the leg backface, then the useful life of the bit is abruptly curtailed.

2. Description of the Prior Art

Conventional practice provides a hard metal disc radially fixed within the cone, presenting a small round thrust face to the end of the spindle shaft. The end of the spindle is, of course, a matching thrust face. Because this bearing is essentially within the apex of the cutter cone, an increase in thrust bearing size requires a shortening of the length of the radial journal bearing to compensate for the large radially disposed thrust bearing.

A series of large ball thrust bearings, primarily used to retain the cones on the journals (located near the end of the main journal bearing), normally run unloaded, coming into bearing contact only in reverse thrust conditions to retain the cone axially on the spindle.

U.S. Pat. No. 3,549,214, held by the same assignee as the present invention, teaches an increase in thrust load capabilities by utilizing a radially disposed surface formed between the large journal bearing and the smaller spindle bearing extending therefrom. This annular, radially disposed surface is called a "snoochie" face by the assignee. By providing both an annular bearing between the "snoochie" face and the cone and a radially disposed disc at the end of the spindle bearing nearest the apex of the cone, an increased axial thrust load bearing capability is realized. Moreover, intermediate separate thrust elements used in both positions permit the wear to be distributed over twice the basic area of bearing, potentially extending bit life by postponing one failure mode. Several separate thrust elements are disclosed to be used between the cone and shaft at both thrust bearing locations.

U.S. Pat. No. 3,720,274 teaches the use of one or more separate thrust elements only at the "snoochie" face formed between the radial journal and spindle bearing.

Both of the foregoing patents avoid closely housing the separate thrust elements radially. U.S. Pat. No. 3,720,274 allows particularly large eccentric dislocations of these thrust elements.

U.S. Pat. No. 4,293,167 discloses the use of a spindleless rotating cone rock bit. Each leg of the bit supports a journal with only one radial bearing and one thrust bearing. The U.S. Pat. No. 4,293,167 patent effectively eliminates dimensional tolerance control problems associated with concentric main and spindle bearings wherein complementary bearing surfaces formed within an associated cone must be closely matched. However, the patent is silent relative to the use of intermediate bearing elements and no special provisions are made to distribute lubricant across the large thrust area as is now taught in the instant invention.

An advantage of the present invention over the prior art is the apparatus to provide a thrust bearing for a rock cutter cone of increased load bearing capacity and extended life expectancy.

Yet another advantage of the present invention over the prior art is the method to provide a first choice of bearing material in run against the stationary spindle shaft and an independent second choice of bearing material to run against the material of the rotating cutter cone.

Still another advantage of the present invention over the prior art is to provide for enhanced lubrication of the thrust faces and to insure the freest independent rotation of the intermediate thrust element by bearing that element radially within the cone.

SUMMARY OF THE INVENTION

To achieve these advantages, an improved bearing is provided, for a rolling cone rock bit, to support the thrust load acting to move the one or more individual cutters radially outward toward a bore hole wall.

The rock bit body forms an inwardly and downwardly directed journal bearing shaft for each rotating cutter used.

A rock cutter is rotatably mounted on its respective journal, the cutter forming at least one radial bearing and at least one thrust bearing thereby.

A separate thrust bearing element, shaped as a disc or as a washer, has one thrust surface in contact with a thrust surface formed on the journal and a substantially parallel second thrust surface in contact with a thrust surface formed in the rotatable cutter. This separate thrust bearing element is borne radially by its outside diameter in a radial bearing formed in the cutter concentric to the at least one radial bearing.

Small ports formed by and directed through the separate thrust bearing element intersect complementary substantially nonconcentric grease distribution grooves formed in the two thrust surfaces.

The small radial bearing surface within the cutter locates, contains and permits free independent rotation of the separate thrust bearing element. The bearing surface within the cutters may have one or more small radially extending pockets formed therein to promote hydrodynamic lubrication of the thrust bearing element radial surfaces.

The radial journal bearing may be, in effect, lengthened to help keep the cutter axially aligned with the journal by the use of a spindle bearing.

A mutually concentric spindle bearing journal extends from the end of the journal bearing shaft. The spindle bearing journal has a bearing surface diameter less than the diameter of the journal bearing shaft. Thus an annular, radially disposed, thrust bearing face may be formed on the exposed end of the journal bearing shaft. A washer-shaped separate thrust bearing element may be used in this location. Of course, a disc-shaped thrust bearing element may also be used against the end of the spindle bearing journal.

Using methods known to those experienced in the art, a composite thrust bearing element may be produced which presents a first metal on a first thrust surface and presents a second metal on the second thrust face. Alternately at least one thrust face could be made to present a composite surface which is a predetermined pattern of alternating areas of a hard bearing material and of an anti-galling material.

A separate thrust bearing element may be made of any one, or of any composite combination, of the following group of materials: aluminum, aluminum bronze, bronze, copper, beryllium copper, lead, tin, zinc, nickel, cobalt, steel, tungsten carbide, titanium carbide or diamond.

The above noted objects and advantages of the present invention will be more fully understood upon a study of the following description in conjunction with the detailed drawings.

BRIEF DESCRIPTION OF THE DRAWINGS

FIG. 1 illustrates one segment of a rock bit body forming a cantilevered journal bearing shaft and, in section, a rock cutter rotatably mounted thereon via a journal bearing, a spindle bearing and an annular thrust bearing element.

FIG. 2 shows another embodiment wherein a rock cutter is rotatably mounted on one large journal bearing and one disc-shaped thrust bearing element.

FIG. 3 is a view taken through 3—3 of FIG. 2 illustrating one thrust face of a disc-shaped thrust bearing element, showing a pattern of lubricant ports and lubricant distribution grooves.

FIG. 4 is an exploded partial section taken through 4—4 of FIG. 2 showing a disc-shaped thrust bearing element and the related mating surfaces as formed within the cutter.

FIG. 5 is a view taken through 5—5 of FIG. 1 illustrating an example of an annular-shaped thrust bearing element showing a pattern of grease ports and lubricant distribution grooves.

DESCRIPTION OF THE PREFERRED EMBODIMENTS AND BEST MODE FOR CARRYING OUT THE INVENTION

Referring to FIG. 1, a leg of a drill bit, generally designated as 10, is illustrated, a predetermined number of such leg segments 10 being finally welded together at interface surface 12 to form a body of a rock bit. The upper pin end of the body forms threads 14 for attachment to the lower end of a drill string. The lower end of each leg segment 10 forms a downwardly and inwardly directed cantilevered journal bearing shaft 16. Journal bearing shaft 16 has extended therefrom a reduced diameter spindle bearing shaft 34, intended to increase axial stability of the rotating cutter, generally designated as 20.

Two potential thrust bearing surfaces are shown, 30 and 36. Although either or both may be utilized, only the large annular surface 30 is depicted as utilized.

The separate, washer-shaped, annular thrust bearing element, generally designated as 40, is rotatably supported in rock cutter 20 by radial bearing surface 32 and bears against thrust face 30, formed on journal bearing shaft 16 and against thrust face 28 formed in rock cutter 20.

The rock cutter 20 is comprised of a generally conically shaped body 22, armed with rock-cutting teeth 24.

Rock cutter 20 is rotatably retained on journal bearing shaft 16 by a multiplicity of bearing balls 18. A mechanical O-ring seal 26 environmentally protects the bearings within rock cutter 20.

FIG. 2 illustrates an alternative embodiment which uses a single large radial journal bearing shaft 17 and a single disc-shaped radially disposed thrust bearing element, generally designated as 50, covering essentially the entire thrust face end 46 of the journal bearing shaft 17.

A residual tooling clearance chamber 58 formed in cone 21 is utilized to reservoir a small amount of lubricant near the cutter thrust face 48.

FIG. 3 shows disc-shaped thrust bearing element 50 with one pattern of grease ports 52 and complementary sets of arcuate grease distribution grooves 54 on opposite sides of disc 50 intersecting grease ports 52.

FIG. 4 details the surfaces formed within the cutter cone 21 of FIG. 2 which cooperate with thrust bearing element 50. One of the three grease ports 52, formed through thrust bearing element 50, is located essentially in the center of thrust bearing element 50 and is in communication with reservoir chamber 58 formed in the cone.

Thrust bearing element 50 is independently rotatable, the radial surface 61 being radially borne by radial bearing surface 60 formed in cutter 21. Hydrodynamic lubrication of radial bearing surface 60 is promoted by the multiple, radially extending, equidistantly spaced lubrication pockets 56 formed also in the cone.

FIG. 5 shows a typical washer-shaped thrust bearing element 40 for use between annular cutter thrust surface 28 and annular journal thrust face 30 of FIG. 1. Grease or lubrication ports 42, formed through thrust bearing element 40, intersect complementary nonconcentric grease distribution grooves 44, formed in the two parallel thrust faces of thrust bearing element 40.

Thrust bearing element 40 is also independently rotatable, the radial surface 33 being radially borne by radial bearing surface 32 formed in cutter 20 of FIG. 1. Radially extending lubrication pockets formed in radial bearing surface 32 in the cone serve to keep radial bearing surface 33 well lubricated.

The separate thrust bearing elements of this invention may be constructed of any one or more of the group of materials consisting of aluminum, aluminum bronze, copper, beryllium copper, lead, tin, nickel, cobalt, steel, tungsten carbide, titanium carbide or diamond and utilizing any acceptable production method.

Specifically, the thrust bearing element may be: (1) of one uniform material; (2) of composite construction presenting a first material on the first thrust face and a second material on the second thrust face; (3) of a structural core with relatively thin bearing material covering a bearing surface; and (4) of composite construction wherein at least one bearing surface presents a predetermined pattern of alternate areas of relatively hard bearing material and of relatively soft anti-galling material.

For example, the thrust bearing element could be a composite having a first side of the element positioned against a radially disposed surface formed by the journal bearing metallurgically bonded with aluminum bronze or beryllium copper and the second side of the thrust bearing element positioned against a radially disposed surface formed in the cone metallurgically bonded with aluminum bronze or beryllium copper with a structural core of steel.

The present invention pertains only to thrust bearings and is intended for use with any type or combination of radial bearings, the objects and advantages of this invention being independent of radial bearing design.

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

I claim:

1. A rock bit comprising:
  a rock bit body forming at least one journal bearing shaft, said journal bearing shaft forming at least one radial bearing surface and at least one radially extending thrust bearing surface,
  a rock cutter rotatably mounted on said journal, said rotatable cutter forming at least one radial bearing and at least one radially extending thrust bearing surface,
  a thrust bearing disc with a first thrust surface in contact with said at least one radially extending thrust bearing surface formed on said journal bearing shaft, and a second thrust surface substantially parallel to said first thrust surface in contact with said at least one radially extending thrust bearing surface formed in said rotatably mounted cutter, said first thrust surface of said disc having at least one first nonconcentric lubricant distribution groove formed therein, a second substantially complementary lubricant distribution groove formed in said second thrust surface of said disc, at least one port extending through said thrust bearing disc, said port intersecting both of said first and second lubricant distribution grooves for providing lubricant communication therebetween, and
  a radial bearing surface formed in said rock cutter to bear said disc concentric to said at least one radial bearing surface formed in said rock cutter, said disc is rotatable relative to said rock cutter and to said bearing journal.

2. The invention as set forth in claim 1 wherein said thrust bearing disc has said first thrust surface of a first metal selected to run against said thrust face formed in said journal bearing spindle shaft, and said second thrust surface of a second metal selected to run against said thrust surface formed in said rock cutter.

3. The invention as set forth in claim 2 wherein said first metal is aluminum bronze and said second metal is beryllium copper.

4. The invention as set forth in claim 2 wherein said first metal is beryllium copper and said second metal is aluminum bronze.

5. The invention as set forth in claim 1 wherein at least one of said thrust bearing disc thrust faces has alternating areas of a first hard bearing material and a second anti-galling material in a predetermined pattern.

6. The invention as set forth in claim 5 wherein said first hard bearing material is selected from the group consisting of tungsten carbide, titanium caribde, nickel, cobalt and steel.

7. The invention as set forth in claim 4 wherein said anti-galling material is selected from the group consisting of aluminum, aluminum bronze, bronze, copper, beryllium copper, tin, lead and zinc.

8. The invention as set forth in claim 1 further comprising a spindle bearing journal extending from an end of said journal bearing shaft, said spindle bearing having a bearing surface diameter less than the diameter of said journal bearing shaft, said thrust bearing disc forming an inner hole adapted to accept said spindle bearing shaft.

9. The invention as set forth in claim 1 wherein said second radial bearing surface has at least one lubricant pocket formed therein.

10. A rock bit comprising:
  a rock bit body forming at least one journal bearing shaft with a radial bearing surface, said shaft forming a mutually concentric spindle bearing journal extending from an end of said journal bearing shaft, said spindle bearing journal having a bearing surface diameter less than the diameter of said journal bearing shaft, said journal bearing shaft forming an annular, radially extending snoochie face thrust bearing surface between said journal bearing shaft and said spindle bearing journal,
  a rock cutter rotatably mounted on said journal bearing shaft, said rotatable cutter forming a radial journal bearing surface, a radial spindle bearing surface, and a radially disposed thrust bearing surface, and
  a thrust bearing washer with a first thrust surface in contact with said annular radially disposed snoochie face thrust bearing formed on said journal bearing shaft, and a second thrust surface substantially parallel to said first thrust surface in contact with said snoochie face thrust bearing surface formed in said rock cutter, said thrust washer is rotatable relative to said bearing journal and said rock cutter and supported substantially concentric to said journal bearing of said rock cutter by a radial bearing surface formed in said rock cutter, said first thrust surface of said washer forming at least one first substantially nonconcentric lubrication distribution groove therein, a second substantially complementary lubricant distribution groove formed in said second thrust surface, and at least one port through said washer, said port intersecting both of said first and second lubricant distribution grooves on either side of said thrust washer.

* * * * *